United States Patent
Cannon et al.

(10) Patent No.: US 6,353,664 B1
(45) Date of Patent: *Mar. 5, 2002

(54) CALLER ID EQUIPMENT WHICH DISPLAYS LOCATION OF CALLER

(75) Inventors: Joseph M. Cannon, Harleysville; James A. Johanson, Emmaus; Richard Lawrence McDowell, Chalfont, all of PA (US)

(73) Assignee: Agere Systems Guardian Corp., Orlando, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/980,824

(22) Filed: Dec. 1, 1997

(51) Int. Cl.[7] ............................ H04M 1/56; H04M 15/06
(52) U.S. Cl. ................................. 379/142.1; 379/88.21; 379/93.23; 379/142.06
(58) Field of Search ........................... 379/88.19–88.21, 379/142, 93.23, 120, 127, 130, 133–134, 354, 127.01, 142.01, 142.04, 142.06, 142.1, 142.17, 142.18, 245

(56) References Cited

U.S. PATENT DOCUMENTS

| | | | |
|---|---|---|---|
| 4,894,861 A | | 1/1990 | Fujioka ...................... 379/374 |
| 4,924,496 A | * | 5/1990 | Figa et al. ................... 379/142 |
| 5,210,789 A | * | 5/1993 | Jeffus et al. ................. 379/127 |
| 5,220,599 A | * | 6/1993 | Sasano et al. ............... 379/142 |
| 5,265,145 A | | 11/1993 | Lim ........................... 379/88.2 |
| 5,446,785 A | * | 8/1995 | Hirai .......................... 379/142 |
| 5,490,205 A | * | 2/1996 | Kondo ....................... 379/142 |
| 5,506,894 A | | 4/1996 | Billings et al. .............. 379/127 |
| 5,506,895 A | * | 4/1996 | Hirai .......................... 379/142 |
| 5,546,447 A | | 8/1996 | Skarbo et al. ............... 379/142 |
| 5,734,706 A | * | 3/1998 | Windsor ...................... 379/142 |
| 5,754,636 A | * | 5/1998 | Bayless ....................... 379/142 |
| 5,771,283 A | * | 6/1998 | Chang et al. ................ 379/142 |
| 5,867,562 A | * | 2/1999 | Scherer ....................... 379/127 |

FOREIGN PATENT DOCUMENTS

| | | | |
|---|---|---|---|
| JP | 404248739 | * | 9/1992 |
| WO | wo-97/17793 | * | 5/1997 |

OTHER PUBLICATIONS

Patent Abstracts of Japan, vol. 017, No. 150 (E–1339), Mar. 25, 1993 & JP 04 316257 A (Murata Mach Ltd), Nov. 6, 1992 *abstract*.
Patent Abstracts of Japan, vol. 016, No. 312 (E–1230), Jul. 9, 1992 & JP 04 086144 A (Mistubishi Electric Corp.) Mar. 18, 1992 *abstract*.
Patent Abstracts of Japan, vol. 097, No. 007, Jul. 31, 1997 & JP 09 064960 A (N.T.T.), Mar. 7, 1997 *abstract*.
Patent Abstracts of Japan, vol. 098, No. 004, Mar. 31 1998 & JP 09 321856 A (Sharp Corp.) Dec. 12, 1997 *abstract*.

* cited by examiner

*Primary Examiner*—Duc Nguyen
(74) *Attorney, Agent, or Firm*—William H. Bollman

(57) ABSTRACT

Customer premises telephone equipment and methods are provided for identifying a calling party's telephone number, household name, and city and/or state location, to a called party. The equipment and method includes one or more directories containing city and state location information corresponding to a complete listing of all area codes an local exchanges throughout a selected calling region or country. A receiver receives an incoming telephone number of an incoming telephone call and a comparator compares the received incoming telephone number with the directory or directories containing the city and state location information to identify a city and state location associated with the incoming telephone number. The equipment includes a display for displaying the incoming telephone call number, the household name, and/or the city and state location associated with the incoming call.

21 Claims, 4 Drawing Sheets

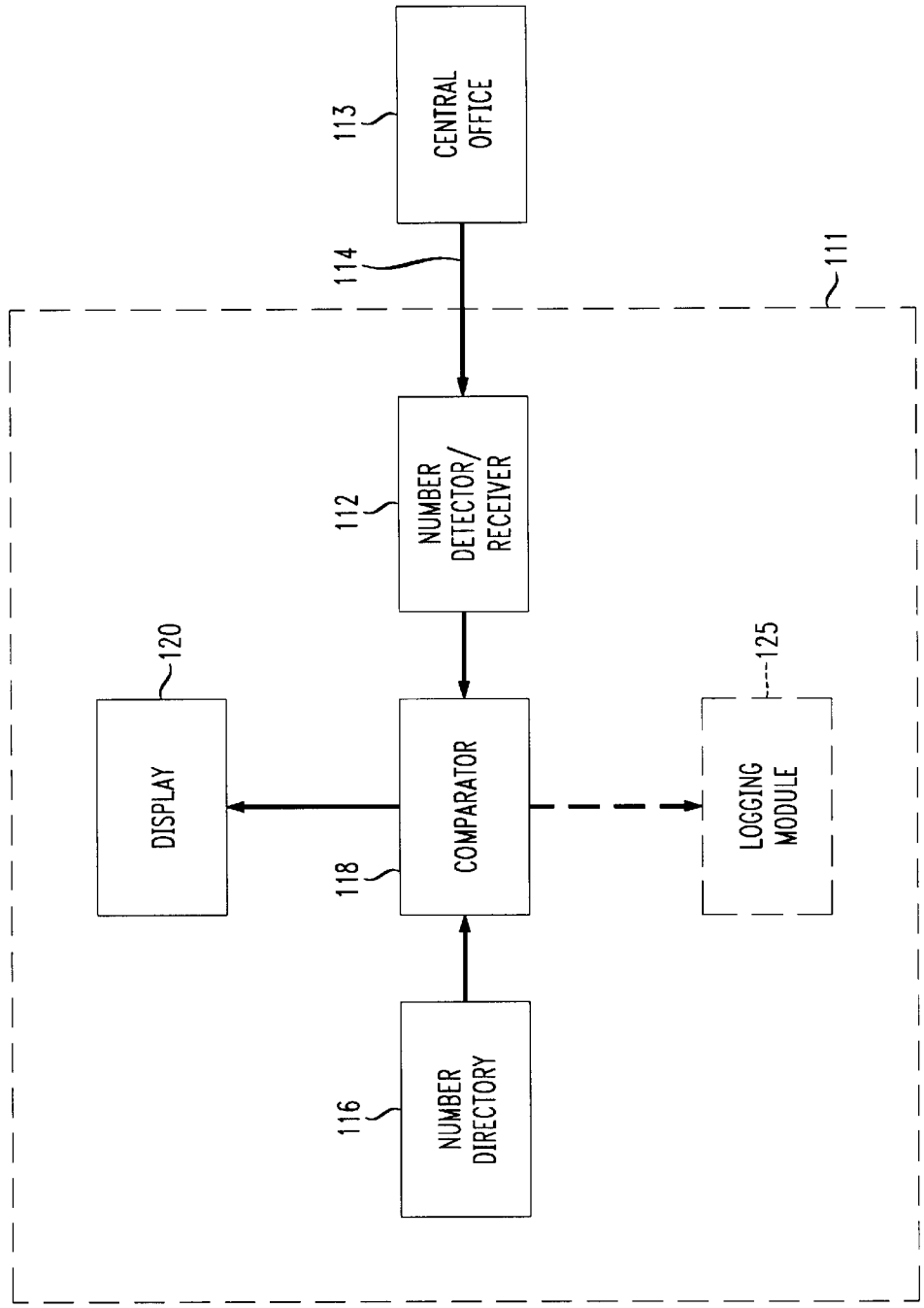

CALLER ID EQUIPMENT WHICH DISPLAYS LOCATION OF CALLER

BACKGROUND OF THE INVENTION

1. Field of the Invention

The present invention relates to caller ID equipment which displays the incoming telephone number and/or household name of a calling party, together with the location associated with the incoming telephone number.

2. Description of Related Art

Many telephone companies offer a special service called Caller ID. Using Caller ID, a caller's telephone number and/or household name is transmitted by the telephone company to the customer. Using Type 1 caller ID service, the caller ID information is transmitted generally during the silent interval between the first two rings. Type 1 caller ID systems which receive caller ID information from incoming calls when the called party is in an on-hook mode are known as Calling Identity Delivery (CID) systems. Type 2 caller ID service includes all Type 1 features but also accommodates the transmission of caller ID information while the called party is already off-hook with another party. The handset of the Type 2 called party's customer premises equipment is muted while caller ID information is transmitted by the central office. Type 2 caller ID/call waiting service is abbreviated as CIDCW.

One conventional Type 1/Type 2 caller ID system is shown in FIG. 4 and includes customer premises equipment 111 having a number detector 112 which displays the telephone number of a calling party received from the central office 113 over the telephone line 114. For Type 1 functionality, when the customer premises equipment 111 is on-hook, the telephone number of the calling party is detected by the number detector 112 during the silent interval between the first and second rings and is compared with telephone numbers stored in a number directory 116 by a comparator 118. For Type 2 functionality, i.e., while in a call waiting mode, the caller ID information follows a caller ID alerting signal sequence (CAS tones). Comparator 118 is a processor, e.g., a microprocessor, a digital signal processor, or a microcontroller. The number directory 116 is stored in Read Only Memory (ROM). When the incoming telephone number from a calling party matches a telephone number in the number directory 116, that telephone number and the calling party's household name associated with that telephone number are displayed on a display device 200. Alternatively, the number directory is located at the central office and household name information is transmitted to the customer premises equipment 111 in the known manner.

In the system described above, the called party is given the opportunity to see the listed household name and telephone number of the calling party before answering the call. Although the telephone number and household name is very helpful, it does not convey all of the phone number's information to the customer, particularly if the caller is calling from a telephone number identified as a corporate account.

SUMMARY OF THE INVENTION

In accordance with the principles of the present invention, customer premises equipment is provided for identifying the household name of a calling party, the telephone number of the calling party, and the location of the calling party. The equipment and method includes a directory of locations corresponding to telephone numbers. A receiver receives an incoming telephone number of an incoming telephone call and a comparator compares the received incoming telephone number with the directory of locations to identify a location associated with the incoming telephone number. The equipment also includes a display for displaying the received incoming telephone number, household name, and location.

BRIEF DESCRIPTION OF THE DRAWINGS

Features and advantages of the present invention will become apparent to those skilled in the art from the following description with reference to the drawings, in which:

FIG. 4 is a block diagram illustrating a conventional caller ID information display system.

DETAILED DESCRIPTION OF THE PRESENTLY PREFERRED EXEMPLARY EMBODIMENTS

It is very difficult for most people to be able to determine the city and state location of the calling party quickly based on the area code and the three-digit exchange of the displayed telephone numbers alone. City and state location information is quite useful in further identifying the calling party and in returning calls. For instance, it is often desirable to know the location and thus the time zone of the person to return a call to.

The present invention is accomplished by incoming call display equipment which detects a caller's telephone number and compares that number with telephone numbers stored in a directory to identify and display the name, telephone number of the calling party, and the city and/or state, providence or other locality of the calling party, all before the call is answered. Alternatively, the directory of household names may be stored at the central office and transmitted to the incoming call display equipment, which would simply receive and display the caller's telephone number, name, and/or city and state information as transmitted by the telephone company. The customer premises equipment may also include other features such as a log of incoming and outgoing telephone calls, their duration, the time and date of those calls either local to the calling party of local to the called party, time difference between time zones, current time local to the calling party, and/or the geographic origin of those calls.

Figure 1:
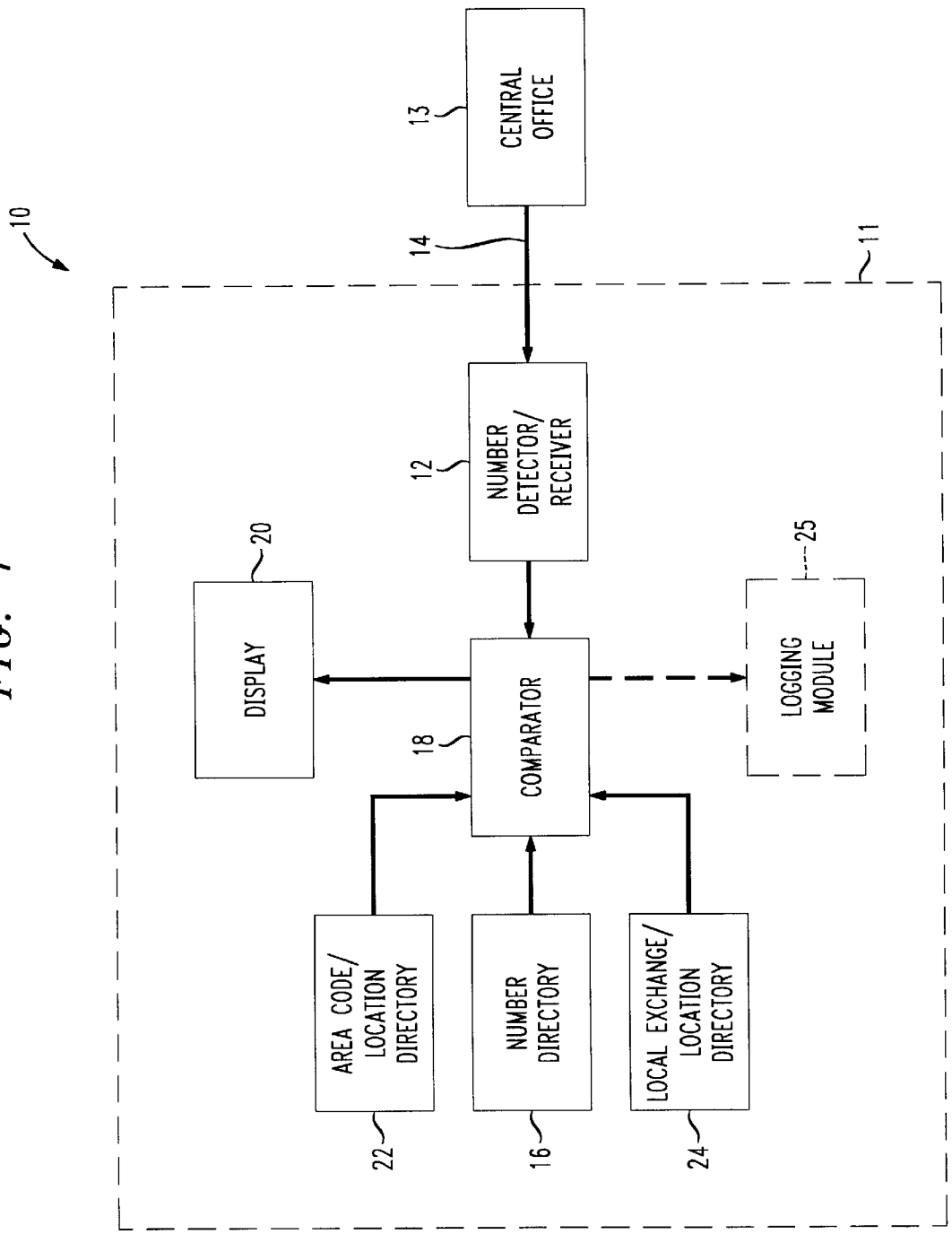
FIG. 1 is a block diagram illustrating an incoming telephone call information display system provided in accordance with the principles of the present invention.

With reference to FIG. 1, a telephone identification display system, generally indicated at 10, includes customer premises equipment 11 having a number detector 12 which displays the telephone number of a calling party received from the central office 13 over the telephone line 14. For Type 1 functionality, when the customer premises equipment 11 is on-hook, the telephone number of the calling party is detected by the number detector 12 during the silent interval between the first and second rings and is compared with telephone numbers stored in a number directory 16 by a comparator 18. For Type 2 functionality, i.e., while in a call waiting mode, the caller ID information follows the CAS tones. Comparator 18 is a processor, e.g., a microprocessor, a digital signal processor, or a microcontroller. The number directory 16 is stored in Read Only Memory (ROM) at the customer premises equipment 11. When the incoming telephone number from a calling party matches a telephone number in the number directory 16, that telephone number and the calling party's household name associated with that telephone number are displayed on a display device 20. The central office 13 can update the directory 16 using, for example, non-volatile RAM.

Alternatively, instead of providing the number directory 16 in the customer premises equipment 11, the telephone number and the household name of the calling party may be stored at a centralized database of the telephone company central office providing the Caller ID service. The information from the number directory stored at the central office 13 would then be transmitted by the central office and received by the number detector/receiver 12 of the customer premises equipment 11. This information may be transmitted along with conventional caller ID information using Type 1 or Type 2 customer premises equipment. The equipment 11 is equally applicable to either Type 1 CID or Type 2 Calling Identity Delivery Call Waiting (CIDCW) service.

The customer premises equipment 11 also includes an area code/location directory 22 wherein the state location of a predetermined list of area codes is stored. The comparator 18 compares the area code of the number detected or received with area codes stored in the area code/location directory 22 to determine the state location of the calling party.

In the illustrated embodiment, a secondary location comparison is performed by a three-digit local exchange/location directory 24 containing a look-up table of local exchanges in various cities corresponding to the state identified in the area code/location directory 22. Thus, if desired, after the primary search criteria is performed to identify the name of the calling party using the number directory 16, and after a secondary search is performed to identify the broad area code location using the area code/location directory 22, a tertiary search may be conducted by the comparator 18 using the three-digit local exchange/location directory 24 to confirm the city and/or state of the calling party. Once the city and/or state data of the incoming caller is identified by the comparator 18, the city and state associated with the incoming telephone number are displayed on the display 20.

The customer premises equipment 11 may also include a logging module 25 to store useful information such as the time, date and duration of each incoming call. Although the area code/location directory 22 and local exchange/location directory 24 are separate in the illustrated embodiment, a single directory combining the contents of both the area code/location directory 22 and the local exchange/location directory 24 is also within the contemplation of the invention.

Figure 2:
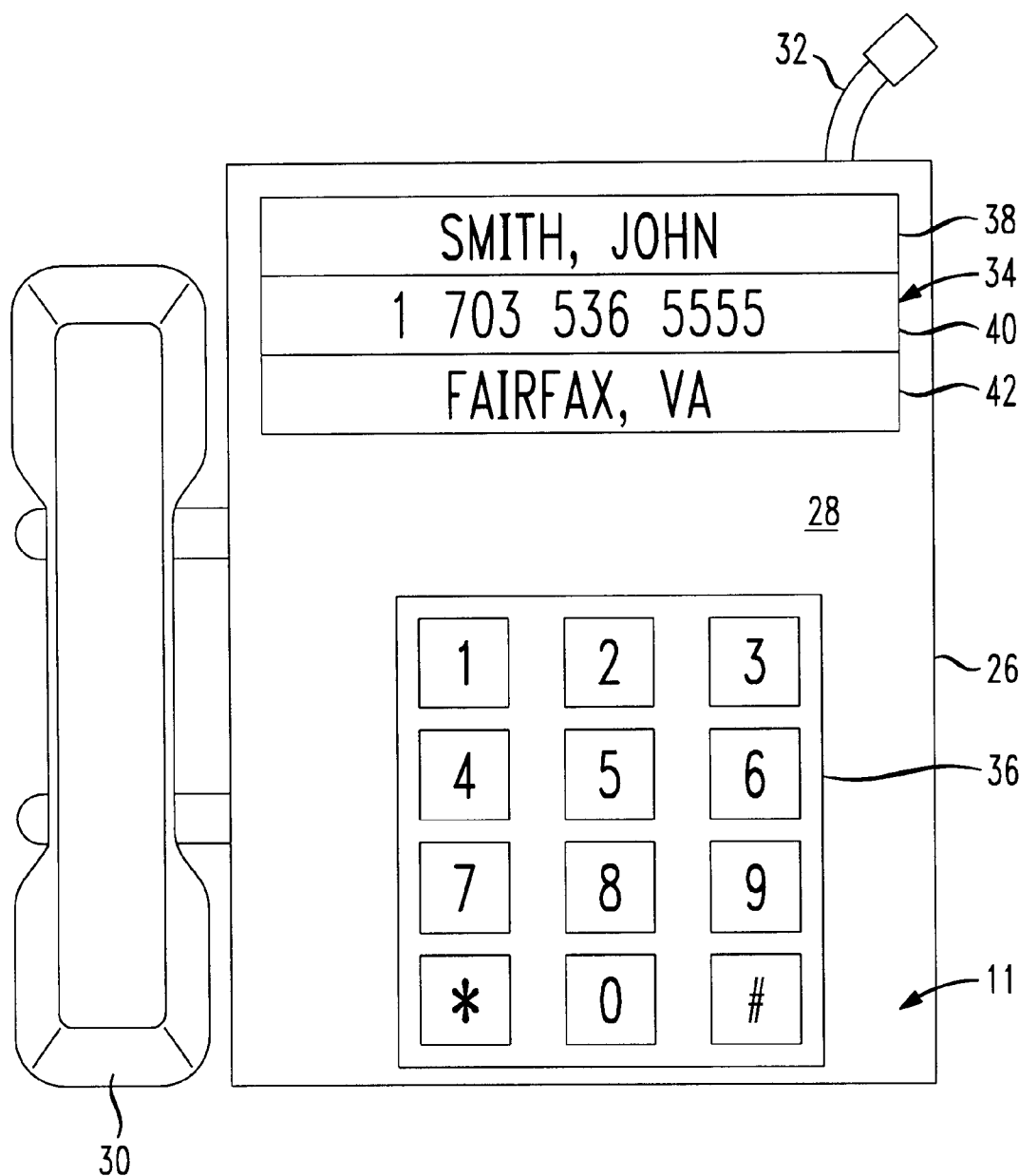
FIG. 2 is a front view of a display panel of a console for the incoming telephone call information display system.

The customer premises equipment 11 is packaged to fit within a portable console 26 which includes a control panel 28, as shown in FIG. 2. The console 26 may be equipped with a standard handset 30 and a phone jack 32 which can be plugged into any standard telephone company modular jack, e.g., an RJ-11 jack. The control panel 28 includes a liquid crystal display (LCD) 34 and a numeric keypad 36.

The LCD display 34 comprises a household name line 38, a number line 40, and a city and state line 42, which are all of suitable character length and are all used in combination to display useful information about the incoming telephone call. For example, when the telephone identification display system 10 receives an incoming call, the name of the calling party as determined from the number directory 16 or as received from the central office 13 (FIG. 1) is displayed on line 38, the telephone number of the calling party is displayed on line 40, and the city and/or state associated with the incoming telephone number of the calling party as determined from the area code/location directory 22 and local exchange/location directory 24 (FIG. 1) are displayed on line 42. If the incoming calling party's telephone number does not match information in any of the area code/location directory 22, the number directory 16, or the local exchange/location directory 24, then the corresponding line 38, 40, 42 of the LCD display 34 is blank or otherwise indicates that the information is not available.

It can be readily appreciated that the caller ID information may be integrated with the customer premises equipment 11 as shown in FIG. 1, or may be provided in a separate, stand alone caller ID box coupled to the same telephone line as the customer premises equipment 11.

Figure 3:
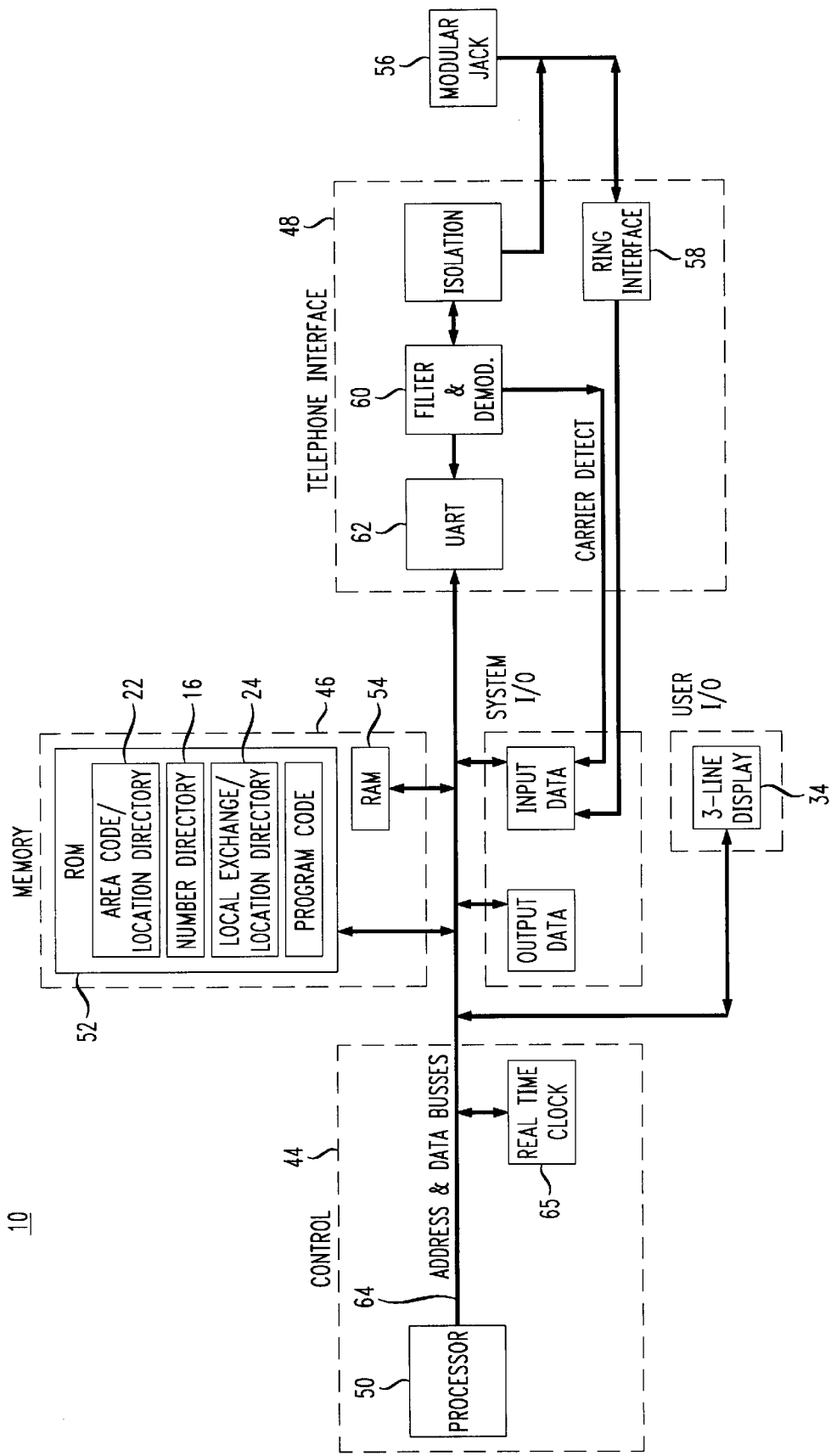
FIG. 3 is a block diagram of the system shown in FIG. 1.

FIG. 3 shows a detailed circuit diagram of one embodiment of incoming call display equipment in accordance with the principles of the present invention. The telephone identification display system 10 includes a control circuit 44, memory 46 and a telephone interface circuit 48. Control circuit 44 includes a processor 50, e.g., a microprocessor, a digital signal processor, or a microcontroller, which controls the system by executing instructions that are stored in memory 46. Memory 46 uses programmable read-only memory (ROM) 52 for storing program code. The area code/location directory 22, the number directory 16, and the local exchange/location directory 24 are all stored in ROM 52. Random access memory (RAM) 54 is also provided for general use and to store log data for logging module 25 (FIG. 1).

The telephone interface circuit 48 includes circuitry which permits the telephone identification display system 10 to be connected directly to a standard telephone module jack 56, i.e., an RJ-11 jack. The telephone interface circuit 48 also includes various control and monitoring circuits that are common to ordinary telephones. These circuits are conventional and may include an electronic telephone circuit (not shown) for controlling dialing functions and for interfacing a telephone handset and a ring detect interface circuit 58 for detecting incoming calls. In the illustrated embodiment, the telephone interface circuit 48 also includes a filter and demodulating circuit 60 that is used for demodulating an incoming serial data stream. Data received by the demodulating circuit includes at least data representing the incoming telephone number received during the silent interval between the first and second ring. Data of household name associated with the incoming number may also be received by the demodulating circuit. The protocol necessary for the circuit shown in FIG. 3 is described in U.S. Pat. No. 4,582,956, the disclosure of which is hereby incorporated by reference into the present specification.

Frequency shift keying, phase shift keying, quadrature amplitude modulation or any other suitable modulation technique may be used for transmitting the incoming serial data stream. A universal asynchronous receiver/transmitter (UART) 62 is used to convert the demodulated serial data received from the demodulating circuit 60 to a parallel format read by the processor 50 via address and data busses 64. Alternatively, the processor 50 can perform the UART function.

A real time clock circuit 65 is also provided to provide timing for the telephone identification display system. The real time clock circuit 65 provides the system with the current time and date.

It can be appreciated that the equipment and method of the invention improves upon the traditional caller ID systems by providing not only the telephone number and household name of the calling party, but also useful additional information such as the city and/or state location or other locality associated with the telephone number of the calling party.

While the invention has been described in accordance with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A method of identifying a calling party to a called party, comprising:

receiving through an analog telephone line interface a telephone number of an incoming telephone call;

comparing an area code of said telephone number with an area code/location directory stored directly within non-networked caller ID equipment of said called party to identify a state associated with said telephone number;

comparing an associated local exchange of said telephone number with a local exchange/location directory stored directly within said caller ID equipment of said called party to identify a city associated with said telephone number; and providing said city and said state associated with said telephone number of said incoming call.

2. The method according to claim 1, further comprising:

receiving a household name associated with said telephone number of said incoming call; and providing said household name.

3. The method according to claim 1, wherein:

said telephone number of said incoming call is received from a central office.

4. The method according to claim 1, further comprising:

providing directly within said caller ID equipment of said called party a directory of household names associated with telephone numbers;

said telephone number of said incoming call being compared with said directory of household names to identify a name associated with said received telephone number of said incoming call; and displaying said name.

5. The method according to claim 1, further comprising:

displaying said telephone number of said incoming call and said location associated with said telephone number of said incoming call on said caller ID equipment of said called party.

6. A method of identifying a calling party to a called party, comprising:

providing non-networked caller ID equipment having within said equipment an area code/location directory to determine state location of said calling party and a local exchange/location directory to determine city location of said location of said calling party;

receiving through an analog telephone line interface, at said caller ID equipment, a telephone number of an incoming telephone call;

comparing an area code of said telephone number of said incoming call with said area code/location directory to identify a state associated with said telephone number of said incoming call;

comparing a local exchange of said telephone number of said incoming call with said local exchange/location directory to identify a city associated with said telephone number of said incoming call;

displaying said telephone number of said incoming call; and displaying said state and said city associated with said telephone number of said incoming call.

7. The method according to claim 6, further comprising:

receiving through an analog telephone line interface, at said caller ID equipment, a household name associated with said telephone number of said incoming call; and displaying said household name.

8. The method according to claim 6, wherein said caller ID equipment further comprises:

a directory of household names associated with telephone numbers;

said received telephone number of said incoming call being compared with said directory of household names to identify a name associated with said received telephone number of said incoming call; and displaying said name.

9. The method according to claim 6, wherein:

said telephone number of said incoming call and said location associated with said telephone number of said incoming call are displayed on said caller ID equipment.

10. Non-networked caller ID equipment for identifying a calling party to a called party, comprising:

an area code/location directory corresponding state locations to area codes of telephone numbers;

a local exchange/location directory corresponding city locations to local exchanges of telephone numbers;

receiving means for receiving through an analog telephone line interface an incoming telephone number of an incoming telephone call;

comparing means for comparing said received incoming telephone number with said area code/location directory and said local exchange/location directory to identify a state and a city, respectively, associated with said received incoming telephone number; and a display to display said received incoming telephone number and said state and said city associated with said received incoming telephone number.

11. The caller ID equipment according to claim 10, wherein:

said receiving means is constructed and arranged to receive through an analog telephone line interface a household name associated with said incoming telephone number of said incoming call; and said display is constructed and arranged to display said household name.

12. The caller ID equipment according to claim 10, wherein:

said display is a three-line LCD display.

13. The caller ID equipment according to claim 10, wherein said comparing means comprises:

a microprocessor.

14. The caller ID equipment according to claim 10, further comprising:

a numeric keypad and telephone handset.

15. The caller ID equipment according to claim 10, wherein:

said directory is contained in memory that is accessible by said microprocessor.

16. Non-networked caller ID equipment for identifying a calling party to a called party, comprising:

an area code/location directory corresponding state locations to area codes of telephone numbers;

a local exchange/location directory corresponding city locations to telephone numbers;

a receiver to receive through an analog telephone line interface an incoming telephone number of an incoming telephone call;

a comparator to compare said received incoming telephone number with said area code/location directory and said local exchange/location directory to identify a state and a city, respectively, associated with said received incoming telephone number; and a display to display said received incoming telephone number and said state and city associated with said received incoming telephone number.

17. The caller ID equipment according to claim 16, wherein:

said receiver is further to receive through an analog telephone line interface a household name associated with said telephone number of said incoming call; and said display is constructed and arranged to display said household name.

18. The caller ID equipment according to claim 16, wherein:

said display is a three line LCD display.

19. The caller ID equipment according to claim 16, wherein said comparator comprises:

a microprocessor.

20. The caller ID equipment according to claim 16, further comprising:

a numeric keypad; and a telephone handset.

21. The caller ID equipment according to claim 19, wherein:

said directory is contained in memory that is accessible by said microprocessor.

* * * * *